(12) United States Patent
Zhang et al.

(10) Patent No.: US 12,386,835 B1
(45) Date of Patent: Aug. 12, 2025

(54) PERSISTING DATABASE QUERY PLANS THAT INCLUDE DYNAMIC CONDITIONS

(71) Applicant: SAP SE, Walldorf (DE)

(72) Inventors: Boyang Zhang, Xi'an (CN); Yinghua Ouyang, Xi'an (CN); Zhen Tian, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/821,049

(22) Filed: Aug. 30, 2024

(51) Int. Cl.
*G06F 16/24* (2019.01)
*G06F 16/245* (2019.01)
*G06F 16/2452* (2019.01)
*G06F 16/2453* (2019.01)
*G06F 16/2455* (2019.01)

(52) U.S. Cl.
CPC .. *G06F 16/24542* (2019.01); *G06F 16/24526* (2019.01); *G06F 16/24539* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 10,545,984 | B2 | 1/2020 | Zhang et al. |
| 11,061,927 | B2 | 7/2021 | Ouyang et al. |
| 11,429,610 | B2 | 8/2022 | Cheng et al. |
| 11,775,521 | B2 | 10/2023 | Ouyang et al. |
| 11,972,012 | B2 | 4/2024 | Ouyang et al. |
| 12,045,155 | B1 | 7/2024 | Ouyang et al. |
| 2005/0182756 | A1* | 8/2005 | Eppley ............... G06F 16/9027 |
| 2018/0107832 | A1 | 4/2018 | Ouyang et al. |
| 2020/0301901 | A1 | 9/2020 | Hao et al. |
| 2021/0303576 | A1 | 9/2021 | Ouyang et al. |
| 2023/0325386 | A1* | 10/2023 | Cruanes ............ G06F 16/24542 707/718 |
| 2023/0376485 | A1* | 11/2023 | Qu ................... G06F 16/24535 |
| 2024/0086404 | A1* | 3/2024 | Lee .................. G06F 16/24542 |
| 2024/0152513 | A1 | 5/2024 | Ouyang et al. |
| 2024/0160627 | A1 | 5/2024 | Ouyang |

OTHER PUBLICATIONS

U.S. Appl. No. 18/180,221, filed Mar. 8, 2023, Zhang et al.
U.S. Appl. No. 18/496,416, filed Oct. 27, 2023, Ouyang.
U.S. Appl. No. 18/496,449, filed Oct. 27, 2023, Ouyang.
U.S. Appl. No. 18/821,078, filed Aug. 30, 2024, Zhang et al.

* cited by examiner

*Primary Examiner* — Son T Hoang
(74) *Attorney, Agent, or Firm* — Fish & Richardson P.C.

(57) ABSTRACT

The present disclosure involves systems, software, and computer implemented methods for managing database query plans with dynamic conditions. One example method includes receiving a request to process a query based on at least one dynamic condition. A serialized abstract query plan is identified, deserialized, and converted into a query optimizer tree. A condition provider procedure is invoked to generate a first filter string for each view in the query optimizer tree. Comparisons are made to determine matches between first filter strings and corresponding second filter string stored in the query optimizer tree. In response to determining that a first filter string does not match the corresponding second filter string, query plan compilation is triggered. In response to determining that each filter string matches each corresponding second filter string, a query plan is generated based on the converted query optimizer tree and the query is executed using the query plan.

20 Claims, 9 Drawing Sheets

```
--create a SQL view protected by row level security
create column table "TEST_SCHEMA"."CETEST_SC_ONEFACTTABLE" ("year_key" nvarchar(10), "year_sid" nvarchar(10), "customer_sid" nvarchar(10), "sales" int);
insert into "TEST_SCHEMA"."CETEST_SC_ONEFACTTABLE" values ('2006', '2006', 'CUSTOMER_A', 1000);
insert into "TEST_SCHEMA"."CETEST_SC_ONEFACTTABLE" values ('2006', '2006', 'CUSTOMER_B', 3000);
insert into "TEST_SCHEMA"."CETEST_SC_ONEFACTTABLE" values ('2007', '2007', 'CUSTOMER_A', 1000);
insert into "TEST_SCHEMA"."CETEST_SC_ONEFACTTABLE" values ('2007', '2007', 'CUSTOMER_B', 2000);
CREATE VIEW "TEST_SCHEMA"."DYNAMICSQLSF_FOR_SQL_VIEW" AS (SELECT * FROM "TEST_SCHEMA"."CETEST_SC_ONEFACTTABLE")
   WITH STRUCTURED FILTER CHECK;
CREATE SCHEMA DYNAMIC_SQL_SF_SCHEMA;
```

FIG. 5A

```
--create permission table
CREATE COLUMN TABLE "DYNAMIC_SQL_SF_SCHEMA"."TABLE_FOR_DYNAMIC_SQL_SF_SQLSF_FOR_SQL_VIEW" ("filter_string" varchar(5000), "userName" varchar(256));
INSERT INTO "DYNAMIC_SQL_SF_SCHEMA"."TABLE_FOR_DYNAMIC_SQL_SF_SQLSF_FOR_SQL_VIEW" VALUES('"year_key" = "2006"', 'SYSTEM');
CREATE PROCEDURE "DYNAMIC_SQL_SF_SCHEMA"."PROC_FOR_DYNAMIC_SQL_SF_SQLSF_FOR_SQL_VIEW" (OUT VAL VARCHAR(5000))
   LANGUAGE SQLSCRIPT SQL SECURITY DEFINER READS SQL DATA AS
BEGIN
   DECLARE v_Val VARCHAR(5000);
   DECLARE CURSOR c_GetOneOperand FOR
      SELECT "filter_string" FROM "DYNAMIC_SQL_SF_SCHEMA"."TABLE_FOR_DYNAMIC_SQL_SF_SQLSF_FOR_SQL_VIEW" WHERE "userName" = SESSION_USER;
   OPEN c_GetOneOperand;
   FETCH c_GetOneOperand INTO v_Val;
   IF c_GetOneOperand::NOTFOUND THEN
      VAL = NULL;
   ELSE
      VAL = v_Val;
   END IF;
   CLOSE c_GetOneOperand;
END;
```

FIG. 5B

--create row level security to bind protected database object and condition provider procedure
CREATE STRUCTURED FILTER "TEST_SCHEMA"."SQLSF_FOR_SQL_VIEW" FOR SELECT ON "TEST_SCHEMA"."DYNAMICSQLSF_FOR_SQL_VIEW"
CONDITION PROVIDER "DYNAMIC_SQL_SF_SCHEMA"."PROC_FOR_DYNAMIC_SQL_SF_SQLSF_FOR_SQL_VIEW";

--filter predicate "year_key" = '2006' from permission table will be retrieved and applied to query execution
SELECT "year_key", "year_sid", "sales" FROM "TEST_SCHEMA"."DYNAMICSQLSF_FOR_SQL_VIEW" GROUP BY "year_key", "year_sid", "sales";

--the preparation count would not increase if dynamic condition or other related objects are changed
SELECT preparation_count, execution_count, * FROM sys.m_sql_plan_cache WHERE to_nvarchar(statement_string) LIKE
'SELECT%DYNAMICSQLSF_FOR_SQL_VIEW%' and to_nvarchar(statement_string) not LIKE 'SELECT%m_sql_plan_cache_%';

FIG. 6A

--change the dynamic filter predicate string by updating the permission table
UPDATE "DYNAMIC_SQL_SF_SCHEMA"."TABLE_FOR_DYNAMIC_SQL_SF_SQLSF_FOR_SQL_VIEW" SET "filter_string" = '"year_key" = "2007"'
WHERE "userName" = 'SYSTEM';

PERSISTING DATABASE QUERY PLANS THAT INCLUDE DYNAMIC CONDITIONS

TECHNICAL FIELD

The present disclosure relates to computer-implemented methods, software, and systems for managing database query plans for queries that include dynamic conditions.

BACKGROUND

A database query plan includes a sequence of steps for executing a query. Different query plans can be created for a same query. The different query plans can be evaluated and a query plan that is predicted to achieve a best performance can be selected for execution of the query.

SUMMARY

The present disclosure involves systems, software, and computer implemented methods for managing query plans for queries that include dynamic conditions. An example method includes: receiving a request to process a database query for at least one view based on at least one dynamic condition specified in a permission table; identifying a serialized abstract query plan for the database query in a persistency layer, wherein the serialized abstract query plan is a persisted and serialized query plan for the database query; deserializing the serialized abstract query plan to create an abstract query plan; converting the abstract query plan into a converted query optimizer tree; invoking a condition provider database procedure to generate a first filter string from the permission table for each view in the converted query optimizer tree; determining whether each first filter string matches a corresponding second filter string stored in a view node of the converted query optimizer tree; in response to determining that at least one first filter string does not match the corresponding second filter string, triggering query plan compilation for the database query; and in response to determining that each filter string matches each corresponding second filter string: generating a query plan based on the converted query optimizer tree; and executing the database query using the query plan generated based on the converted query optimizer tree.

Implementations may include one or more of the following features.

The serialized abstract query plan can be identified after a database system restart. The serialized abstract query plan can be identified after a query plan for the database query has been evicted from a query plan cache. The abstract query plan can be generated from a first query plan produced during query plan compilation. The abstract query plan generated from the first query plan produced during query plan compilation can be serialized to produce the serialized abstract query plan. The serialized abstract query plan can be saved in the persistency layer. The serialized abstract query plan can be a JavaScript Object Notation representation of the abstract query plan. Query plan compilation can include: parsing the database query to generate a global query parse tree; converting the global query parse tree to a query compiler tree; and converting the query compiler tree to a query optimizer tree. Query plan compilation can include traversing the query optimizer tree to collect all view nodes that have a dynamic condition. Query plan compilation can include saving, in the query plan, dynamic condition information for collected view nodes. The condition provider database procedure can generate different first filter strings for different users.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5A illustrates example database statements for creating a view protected by row level security.

FIG. 5B illustrates example database statements for creating a permission table.

FIG. 5C illustrates an example database statement for creating row level security by binding a protected database object and condition provider procedure.

FIG. 5D illustrates an example query for which a filter predicate is applied during query execution.

FIG. 6A illustrates an example query that can be executed to determine whether dynamic conditions have changed for a query as compared to dynamic conditions of a query retrieved from a query plan cache.

FIG. 6B illustrates an example database statement that can be executed to update a permission table.

DETAILED DESCRIPTION

Figure 1:
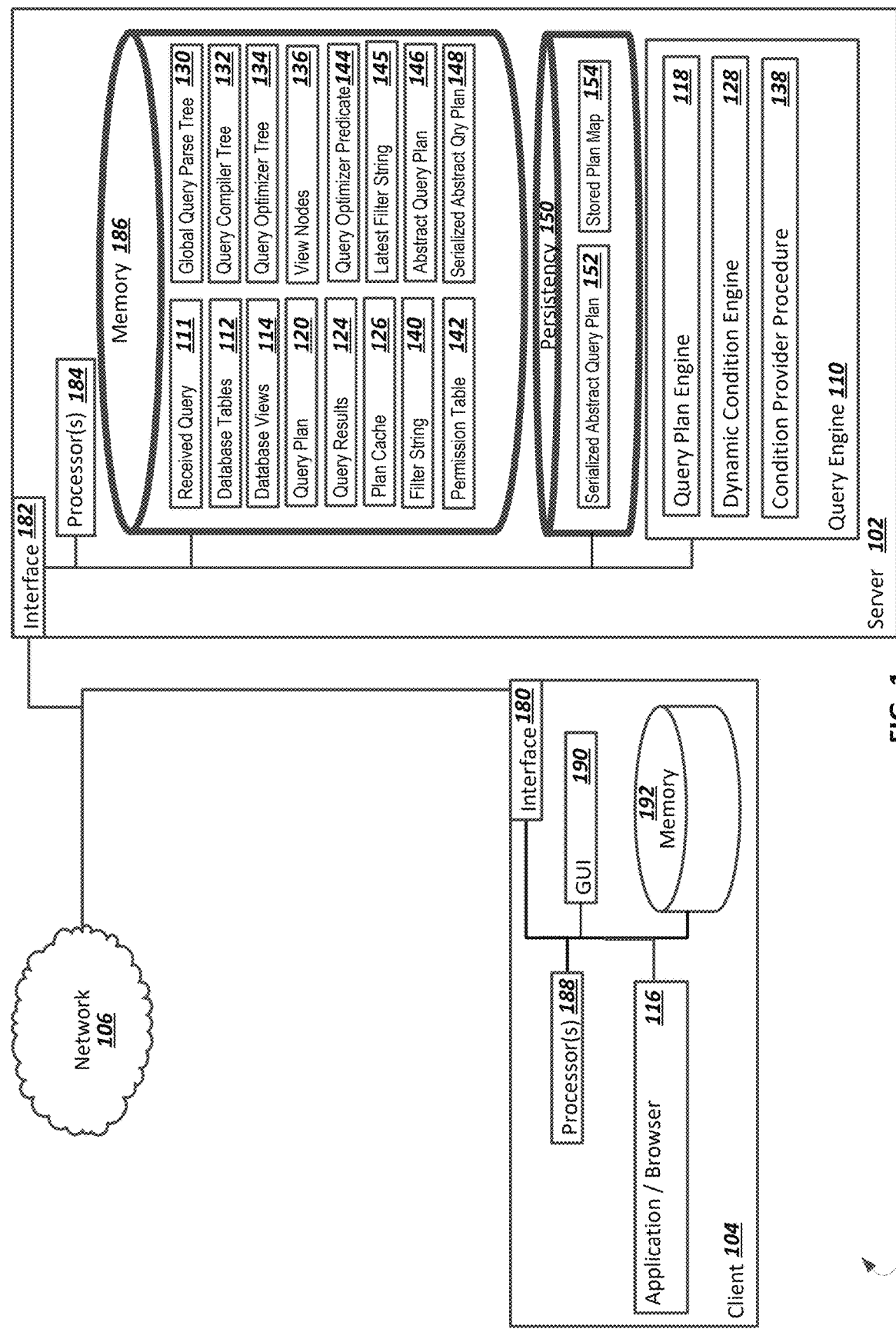
FIG. 1 is a block diagram illustrating an example system for managing query plans for queries that include dynamic conditions.

Dynamic plan conditions can be used for row level access control on database objects in a database system. For example, while sales data for all regions may be included within one analytic view, a database can be configured so that regional sales managers only see the data for their region. Dynamic plan conditions can generate different filter strings for different users to access different portions of data in the same view.

However, some database systems may have limitations with regards to dynamic plan conditions. For instance, a database system as initially designed may not support caching of query plans that include dynamic conditions. As a result, a query plan with dynamic conditions cannot leverage the plan cache to avoid unnecessary query compilation, since the query would need to be compiled for each query execution rather than using precompiled information in the plan cache. Compiling the query for each execution can have a substantial negative effect on query performance as compared to queries that use the plan cache.

As another example, a database system that supports abstract query plans (e.g., abstract SQL (Structured Query Language) plans), might not, as initially designed, support abstract query plans that include dynamic plan conditions. An abstract query plan is a persisted and serialized query optimization plan that can be used to ensure stability of query performance plans so that query performance plans can be used to reduce query compilation even after a system restart. When a database system does not support abstract query plans with dynamic plan conditions, a query involving dynamic conditions cannot leverage an abstract query plan to reduce query compilation times, and therefore query performance can be negatively affected.

Different solutions can be used to solve the problems described above that can occur due to database limitations with respect to dynamic plan conditions. For example, a persistency solution can be used to add support to a database system for persisted query plans that involve dynamic conditions. As another example, a caching solution can be used to add support to a database system for caching query plans with dynamic conditions.

As an overview, the persistency solution for adding support for persisted query plans that include dynamic conditions can include activities in an abstract query plan capture phase and an abstract query plan replay phase. In the abstract query plan capture phase, dynamic conditions can be collected and saved as part of a query plan for each view upon filter injection during query compilation. An abstract query plan can be generated from the query plan before a query execution plan generation phase. The abstract query plan that includes dynamic conditions can be serialized (e.g., into a JSON (JavaScript Object Notation) representation) and the serialized abstract query plan can be stored in a persistency layer.

In the abstract query plan replay phase, an abstract query plan can be retrieved from the persistency layer and deserialized. Abstract query plan structure(s) in the deserialized data that include dynamic conditions can be converted to a query optimizer (QO) tree structure. A condition provider procedure can be invoked to generate a filter string from a permission table for each view in the converted QO tree. A comparison can be performed to determine whether a latest filter string of a query is the same as a filter string saved in dynamic conditions of the QO tree. If such a comparison returns a match, the system can determine that an abstract query plan replay succeeded and that an abstract query plan specific compilation shortcut can be used for the query, thus improving performance as compared to recompiling a query plan. If the comparison does not result in a match, the system can determine that the abstract query plan replay did not succeed and that a fallback procedure of query compilation for the query can be performed.

For the caching solution of adding support to a database system for caching query plans with dynamic conditions, dynamic conditions can be collected and normalized as unified filter strings for each view upon filter injection during query compilation. The collected dynamic conditions can be saved as part of respective cached query plans. When executing a generated query plan for a received query, a condition provider procedure can be invoked to generate a filter string from a permission table for each view. A comparison can be performed to determine whether a latest filter string of the query is the same as a filter string saved in a cached query plan. If the comparison returns a match, the cached query plan can be used, thus saving query plan recompilation. If the comparison does not return a match, the current query plan can be invalidated which can trigger query recompilation. The second solution thus provides a method to cache query plans for queries that include dynamic conditions so that the plan cache can be leveraged for such queries, which can avoid unnecessary query compilation and substantially improve query performance.

FIG. 1 is a block diagram illustrating an example system 100 for managing query plans for queries that include dynamic conditions. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A server 102 (e.g., a database server) includes a query engine 110. The query engine 110 can process a received query 111 against database artifacts such as database tables 112, database views 114, etc. The query engine 110 can process queries based on requests received from an application/browser 116, from internal server processes, or other types of requests. A query plan engine 118 of the query engine 110 can generate a query plan 120 based on the received query 111. The query engine 110 can execute the query plan 120 to generate query results 124. The query results 124 can be provided to a requestor who provided the received query 111. The query plan 120 can be placed into a plan cache 126 so that the query plan 120 may be reused for processing other queries that are the same (or have a same form) as the received query 111.

As described above, a database system, before implementation of the solutions described herein, might not support storing, in the plan cache 126, queries that have dynamic conditions. A dynamic condition engine 128 (which can be part of the query plan engine 118 or can be a separate component) can provide support for caching query plans for queries that have dynamic conditions. When a first instance of a particular received query 111 that includes a dynamic condition is received, the plan cache 126 will not have an entry for the query. The dynamic condition engine 128 can perform a set of steps to add caching support for the query. Although these steps are described below as being performed by the dynamic condition engine 128, some steps may be more generally performed by the query engine 110.

As an example, the dynamic condition engine 128 can process the received query 111 by parsing, checking, and pre-processing the received query 111 which can result in generation of a global query parse tree 130. The dynamic condition engine 128 can convert the global query parse tree 130 to a query compiler tree 132 and a query optimizer tree 134. The dynamic condition engine 128 can traverse the query optimizer tree 134 and generate or identify a collection of view nodes 136 that have dynamic conditions.

The dynamic condition engine 128 can perform a set of steps for each view node in the collection of view nodes 136. For example, the dynamic condition engine 128 can invoke a condition provider procedure 138 to generate a dynamic filter predicate string 140 from a permission table 142. The permission table 142 is shown as separate from the database tables 112 for illustration purposes but may be included in the database tables 112. The dynamic condition engine 128 can convert the dynamic filter predicate string 140 to a query optimizer predicate 144. The dynamic condition engine 128 can inject the query optimizer predicate 144 into a corresponding view node in the query optimizer tree 134. The dynamic condition engine 128 can normalize dynamic conditions as a unified filter string. The dynamic condition engine 128 (or more generally the query engine 110) can perform other optimizations of the query optimizer tree 134. The dynamic condition engine 128 (or more generally the query engine 110) can generate the query plan 120 (e.g., based at least on the query optimizer tree 134). The dynamic condition engine 128 can insert the query plan 120 into the plan cache 126. The query engine 110 can execute the first instance of the received query 111 based on the query plan 120.

For subsequent instances of the received query 111, the dynamic condition engine 128 can perform a lookup for the query in the plan cache 126 and determine that a cache hit occurs, which can result in the dynamic condition engine 128 determining whether to use a cached query plan for the query. For instance, the dynamic condition engine 128 can validate a query plan 120 identified in the plan cache 126. For instance, for each view for which dynamic conditions are saved in the query plan 120, the dynamic condition engine 128 can invoke the condition provider procedure 138 to generate a latest filter string 145 from the permission table 142. The dynamic condition engine 128 can determine whether the latest filter string 145 matches the filter string 140 previously saved in the query plan 120. If the latest filter string 145 matches the filter string 140 previously saved in the query plan 120, the query engine 110 can execute the query using the query plan 120 identified in the plan cache 126. Accordingly, processing resources can be saved by using the cached query plan. If the latest filter string 145 does not match the filter string 140 previously saved in the query plan 120, the query plan 120 can be invalidated and query recompilation can be triggered (and a new query plan 120 can be generated and used for the query).

When processing the received query 111 (e.g., for the first time), the dynamic condition engine 128 can also perform steps regarding adding persistency support for abstract query plans. The dynamic condition engine 128 may perform the persistency support steps separately from the caching support steps, or may perform some of the persistency support steps in conjunction with the caching support steps.

As mentioned above, the persistency support steps include steps for a capture phase and a reply phase. In the capture phase, the dynamic condition engine 128 can process the received query 111 by parsing, checking, and pre-processing the received query 111 to generate the global query parse tree 130 and convert the global query parse tree 130 to the query compiler tree 132 and the query optimizer tree 134. The dynamic condition engine 128 can traverse the query optimizer tree 134 to generate the collection of view nodes 136 that have dynamic conditions. The dynamic condition engine 128 can, for each view node, inject dynamic conditions into the query optimizer tree 134 and save the dynamic conditions as part of the query plan 120.

The dynamic condition engine 128 can generate an abstract query plan 146 from the query plan 120. The dynamic condition engine 128 can serialize the abstract query plan 146, such as by converting the abstract query plan 146 into a JSON (JavaScript Object Notation) format or another serialized format, to create a serialized abstract query plan 148. The dynamic condition engine 128 can store the serialized abstract query plan 148 in a persistency layer 150, as a stored serialized abstract query plan 152. Additionally, the dynamic condition engine 128 can add an entry in a stored plan map 154 that maps the stored serialized abstract query plan 152 to the received query 111.

The dynamic condition engine 128 (or more generally the query engine 110) can generate the query plan 120 (e.g., based at least on the query optimizer tree 134). The query engine 110 can execute the received query 111 based on the query plan 120. As mentioned, the capture phase of the persistency solution can be performed at least partially in conjunction with the caching solution, so that the first instance of the received query 111 is executed after the query plan 120 is cached and after the serialized abstract query plan 148 is stored in the persistency layer 150.

The server 102 can leverage the stored serialized abstract query plan 152, such as after a system restart (which can result in clearing of memory 186 of the server 102) and/or after a query plan 120 is evicted from the plan cache 126. The query plan 120 may be evicted from the plan cache 126 due to capacity limitation of the plan cache 126, for example.

For example, when another instance of the received query 111 is received, the dynamic condition engine 128 can process the received query 111 by parsing, checking, and pre-processing the received query 111 to generate the global query parse tree 130 and convert the global query parse tree 130 to the query compiler tree 132. The dynamic condition engine 128 can look up the received query 111 in the stored plan map 154 to copy the stored serialized abstract query plan 152 into the serialized abstract query plan 148. The dynamic condition engine 128 can deserialize the serialized abstract query plan 148 to obtain the abstract query plan 146. The dynamic condition engine 128 can convert the abstract query plan 146, including dynamic conditions, to the query optimizer tree 134.

The dynamic condition engine 128 can invoke the condition provider procedure 138 to generate a latest filter string 145 from the permission table 142 for each view in the query optimizer tree 134. The dynamic condition engine 128 can determine, for each view, whether the latest filter string 145 for the view matches a filter string saved in dynamic conditions of the view in the query optimizer tree 134. If each comparison for views of the received query 111 results in a match, the dynamic condition engine 128 can determine to perform a shortcut by using the query optimizer tree 134 converted from the abstract query plan 146. For example, the dynamic condition engine 128 can generate the query plan 120 based on the converted query optimizer tree 134 and execute the received query 111 using the query plan 120.

As another example, if the dynamic condition engine 128 determines, for at least one view, that the latest filter string 145 for the view does not match a filter string saved in dynamic conditions of the view in the query optimizer tree 134, that the abstract query plan shortcut cannot be performed and that a fallback to standard query compilation should be performed. For example, the dynamic condition engine 128 can generate a new version of the query optimizer tree 134 from the current version of the query compiler tree 132. The dynamic condition engine 128 can traverse the query optimizer tree 134 and generate or identify a collection of view nodes 136 that have dynamic conditions.

The dynamic condition engine 128 can inject dynamic conditions into a corresponding view node in the query optimizer tree 134. The dynamic condition engine 128 (or more generally the query engine 110) can perform other optimizations of the query optimizer tree 134, as part of query compilation. The dynamic condition engine 128 (or more generally the query engine 110) can generate the query plan 120 (e.g., based at least on the query optimizer tree 134). The query engine 110 can execute the first instance of the received query 111 based on the query plan 120. The dynamic condition engine 128 can also insert the query plan 120 into the plan cache 126, as described above.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 180 and 182 are used by the client device 104 and the server 102, respectively, for communicating with other systems in a distributed environment—including within the system 100—connected to the network 106. Generally, the interfaces 180 and 182 each comprise logic encoded in software and/or hardware in a suitable combination and operable to communicate with the network 106. More specifically, the interfaces 180 and 182 may each comprise software supporting one or more communication protocols associated with communications such that the network 106 or interface's hardware is operable to communicate physical signals within and outside of the illustrated system 100.

The server 102 includes one or more processors 184. Each processor 184 may be a central processing unit (CPU), a blade, an application specific integrated circuit (ASIC), a field-programmable gate array (FPGA), or another suitable component. Generally, each processor 184 executes instructions and manipulates data to perform the operations of the server 102. Specifically, each processor 184 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 186. In some implementations, the server 102 includes multiple memories. The memory 186 may include any type of memory or database module and may take the form of volatile and/or non-volatile memory including, without limitation, magnetic media, optical media, random access memory (RAM), read-only memory (ROM), removable media, or any other suitable local or remote memory component. The memory 186 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application/browser 116. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 188. Each processor 188 included in the client device 104 may be a central processing unit (CPU), an application specific integrated circuit (ASIC), a field-programmable gate array (FPGA), or another suitable component. Generally, each processor 188 included in the client device 104 executes instructions and manipulates data to perform the operations of the client device 104. Specifically, each processor 188 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 190.

The GUI 190 of the client device 104 interfaces with at least a portion of the system 100 for any suitable purpose, including generating a visual representation of the application/browser 116. In particular, the GUI 190 may be used to view and navigate various Web pages, or other user interfaces. Generally, the GUI 190 provides the user with an efficient and user-friendly presentation of business data provided by or communicated within the system. The GUI 190 may comprise a plurality of customizable frames or views having interactive fields, pull-down lists, and buttons operated by the user. The GUI 190 contemplates any suitable graphical user interface, such as a combination of a generic web browser, intelligent engine, and command line interface (CLI) that processes information and efficiently presents the results to the user visually.

Memory 192 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 192 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
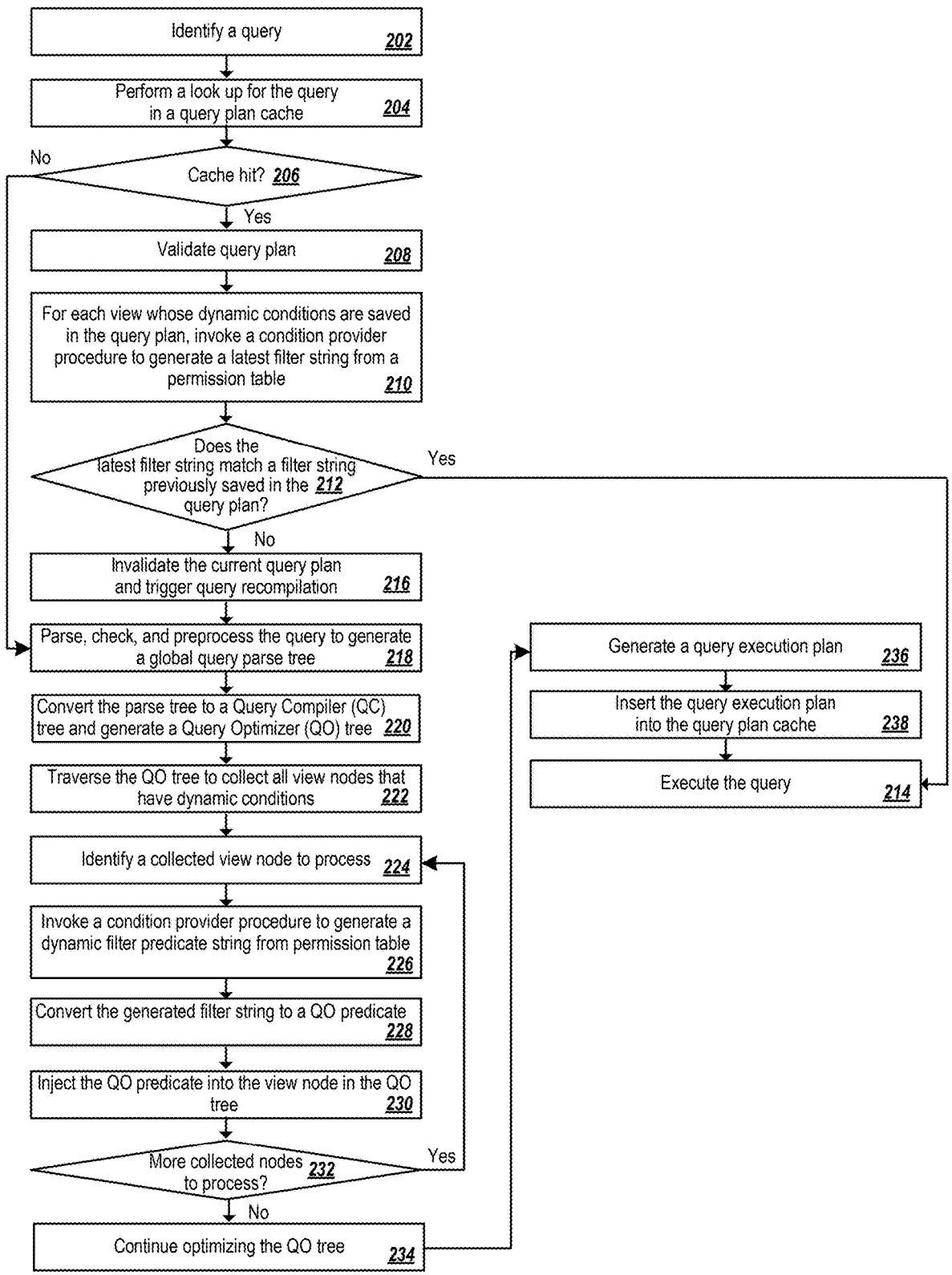
FIG. 2 is a flowchart of an example method for adding caching support for query plans for queries that include dynamic conditions.

FIG. 2 is a flowchart of an example method 200 for adding caching support for query plans for queries that include dynamic conditions.

At 202, a query is identified.

At 204, a lookup is performed to attempt to locate a cached query plan for the query in a plan cache.

At 206, a determination is made as to whether a cache hit has occurred (e.g., whether the attempt to locate a cached query plan for the query in the plan cache was successful).

At 208, if a cache hit has occurred, the query plan retrieved from the cache is validated.

At 210, for each view whose dynamic conditions are saved in the query plan, a condition provider procedure is invoked to generate a latest filter string from a permission table.

At 212, a determination is made, for each view whose dynamic conditions are saved in the query plan, whether the latest filter string from the permission table matches a filter string previously saved in the query plan.

At 214, if, for each view, the latest filter string matches a filter string stored in the query plan, the query is executed using the query plan.

At 216, if at least one latest filter string does not match a filter string previously saved in the query plan, the query plan is invalidated and query recompilation is triggered.

At 218, the query is parsed, checked, and preprocessed to generate a global query parse tree.

At 220, the global query parse tree is converted to a query compiler (QC) tree and a query optimizer (QO) tree.

At 222, the query optimizer tree is traversed to collect all view nodes that have dynamic conditions.

At 224, a given collected view node to process is identified.

At 226, a condition provider procedure is invoked to generate a dynamic filter predicate string from the permission table.

At 228, the dynamic filter predicate string is converted to a QO predicate.

At 230, the QO predicate is injected into the view node in the QO tree.

At 232, a determination is made as to whether there are any more collected view nodes to process. If there is at least one more collected view node to process, a next collected view node to process is identified (e.g., at step 224).

At 234, when there are no more collected view nodes to process, further optimizations of the QO tree may be performed.

At 236, a query execution plan is generated for the query (e.g., based on the QO tree).

At 238, the query execution plan is inserted into the query plan cache (e.g., for use by subsequent executions of the query). The query can then be executed (e.g., at step 214) based on the query execution plan.

Figure 3:
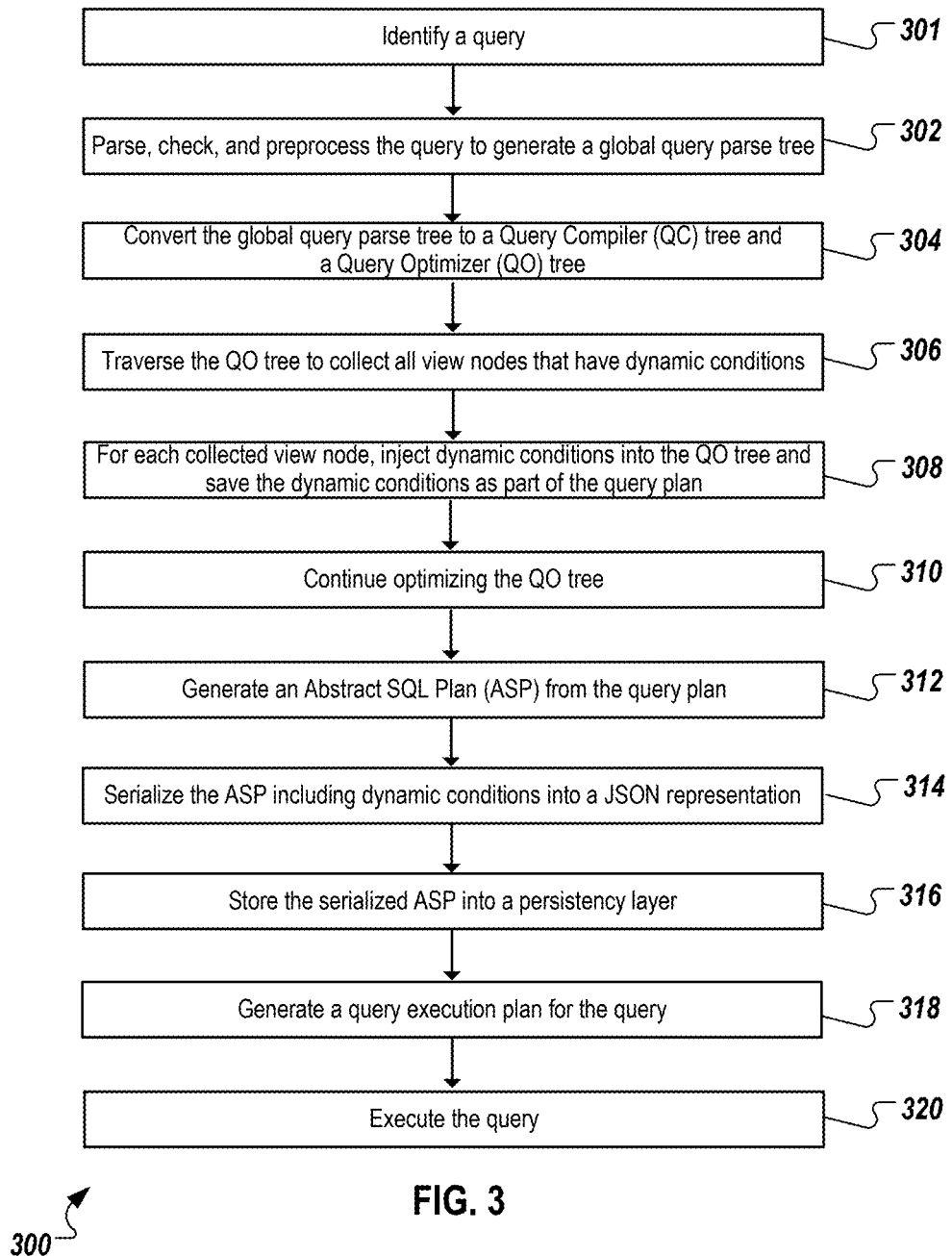
FIG. 3 is a flowchart of an example method for a capture phase of adding persistency support for query plans for queries that include dynamic conditions.

FIG. 3 is a flowchart of an example method 300 for a capture phase of adding persistency support for query plans for queries that include dynamic conditions.

At 301, a query is identified.

At 302, the query is parsed, checked, and preprocessed to generate a global query parse tree.

At 304, the global query parse tree is converted to a query compiler (QC) tree and a query optimizer (QO) tree.

At 306, the query optimizer tree is traversed to collect all view nodes that have dynamic conditions.

At 308, for each collected view node, dynamic conditions are injected into the query optimizer tree and saved as part of a query plan.

At 310, further optimizations of the query optimizer tree are performed.

At 312, an abstract SQL plan (e.g., ASP, or abstract query plan) is generated from the query plan.

At 314 the ASP including dynamic conditions is serialized (e.g., into a JSON representation).

At 316, the serialized ASP is stored in a persistency layer.

At 318, a query execution plan is generated for the query (e.g., based on the QO tree).

At 320, the query is executed based on the query execution plan.

Figure 4:
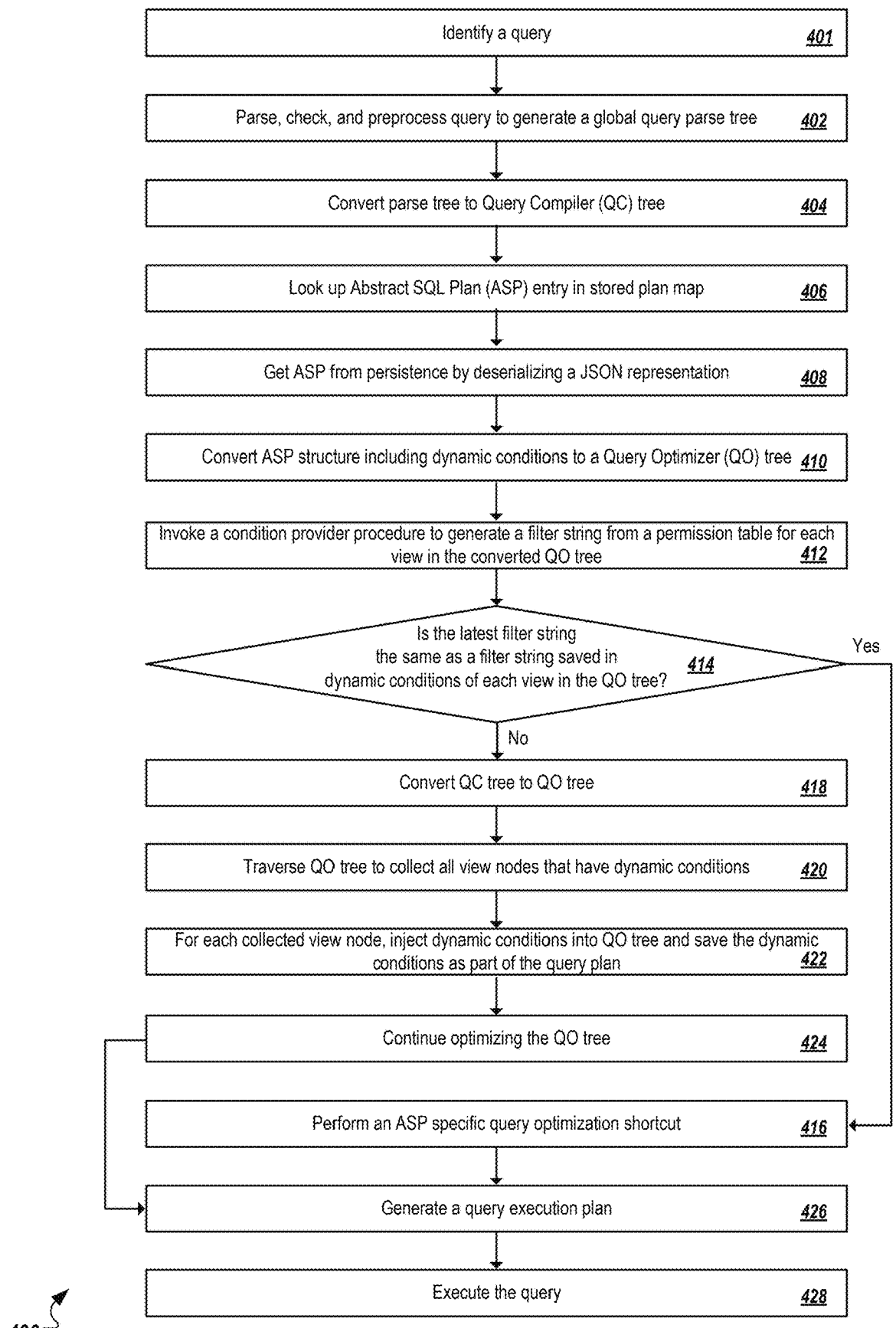
FIG. 4 is a flowchart of an example method for a replay phase of adding persistency support for query plans for queries that include dynamic conditions.

FIG. 4 is a flowchart of an example method 400 for a replay phase of adding persistency support for query plans for queries that include dynamic conditions.

At 401, a query is identified.

At 402, the query is parsed, checked, and preprocessed to generate a global query parse tree.

At 404, the global query parse tree is converted to a query compiler (QC) tree.

At 406, a look up in a stored plan map is performed to locate an ASP entry for the query.

At 408, an ASP structure is obtained from the stored plan map by deserializing a JSON representation in the located ASP entry.

At 410, the ASP structure, including dynamic conditions in the ASP structure, is converted into a Query Optimizer (QO) tree.

At 412, a condition provider procedure is invoked to generate a filter string from a permission table for each view in the converted QO tree.

At 414, for each view in the converted QO tree, a determination is made as to whether a latest filter string is the same filter string as a filter string saved in dynamic conditions in the QO tree.

At 416, if the result of the comparison in step 414 is yes, an ASP specific query optimization shortcut is performed by using the obtained ASP during query optimization.

At 418, if the result of the comparison in step 414 is no, the QC tree is converted into a query optimizer (QO) tree.

At 420, the query optimizer tree is traversed to collect all view nodes that have dynamic conditions.

At 422, for each collected view node, dynamic conditions are injected into the query optimizer tree and saved as part of a query plan.

At 424, further optimizations of the query optimizer tree are performed.

At 426 (e.g., either arriving at step 426 after step 424 or after step 416), a query execution plan is generated.

At 428, the query is executed based on the query execution plan.

FIG. 5A illustrates example database statements 500 for creating a view protected by row level security. A statement 502 can be executed to create a table. Statements 504 can be executed to populate the table with values. A statement 506 can be executed to create, based on the table, a view that is protected by row level security (e.g., using a structured filter check). A statement 508 can be executed to create a schema for the view and table.

FIG. 5B illustrates example database statements 530 for creating a permission table and condition provider procedure. A statement 532 can be executed to create the permission table. A statement 534 can be executed to insert values into the permission table. A statement 536 can be executed to create the condition provider procedure that can be used to generate filter strings from the permission table.

FIG. 5C illustrates example an database statement 560 for creating row level security by binding a protected database object and condition provider procedure. The database statement 560 can be executed to bind the view created using the database statements 500 described above with respect to FIG. 5A with the condition provider procedure created using the database statements 530 described above with respect to FIG. 5B.

FIG. 5D illustrates an example query 580 for which a filter predicate is applied during query execution. When the query 580 is executed, for example, a filter predicate of "'year_key'='2006'" can be retrieved from the permission table (e.g., based on the configurations achieved from execution of the example database statements 500, 530, and 560) and applied to the execution of the example query 580. The query 580 is an example of a query for which query plan caching support and/or abstract query plan persistency can be performed, for example, as described herein.

FIG. 6A illustrates an example query 600 that can be executed to determine whether dynamic conditions have changed for a query as compared to dynamic conditions of a query retrieved from a query plan cache. The example query 600 can correspond to step 212 of FIG. 2, for example.

FIG. 6B illustrates an example database statement 650 that can be executed to update a permission table. The example database statement 650 can be executed, for example, when dynamic conditions have changed for a query as compared to dynamic conditions of a query retrieved from a query plan cache. In response to dynamic condition changes, the cached query plan can be invalidated, a query compiler can recompile the query which can include execution of the database statement 650 for changing a dynamic filter predicate string by updating the permission table.

Figure 7:
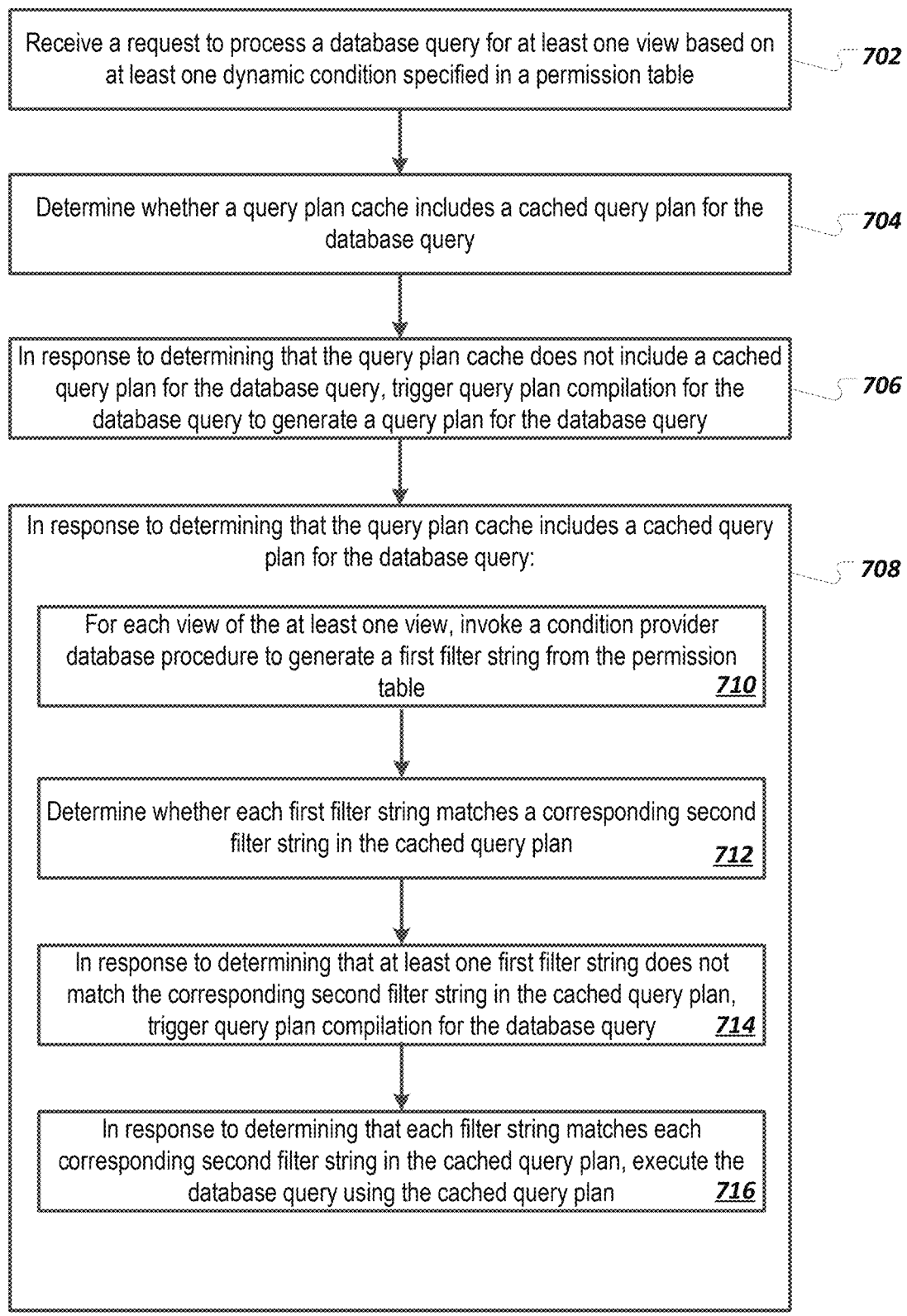
FIG. 7 is a flowchart of an example method for adding caching support for query plans for queries that include dynamic conditions.

FIG. 7 is a flowchart of an example method for adding caching support for query plans for queries that include dynamic conditions. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the dynamic condition engine 127 of FIG. 1.

At 702, a request is received to process a database query for at least one view based on at least one dynamic condition specified in a permission table.

At 704, a determination is made as to whether a query plan cache includes a cached query plan for the database query.

At 706, in response to determining that the query plan cache does not include a cached query plan for the database query, query plan compilation is triggered for the database query to generate a query plan for the database query. The database query can be executed using the generated query plan after query plan compilation. The query plan can be inserted into the query plan cache after query plan compilation.

Query plan compilation for a query based on dynamic conditions can include parsing the database query to generate a global query parse tree, converting the global query parse tree to a query compiler tree, and converting the query compiler tree to a query optimizer tree. Query plan compilation can also include traversing the query optimizer tree to collect all view nodes that have a dynamic condition and saving, in the query plan, dynamic condition information for collected view nodes. Saving dynamic condition information for a first collected view node can include invoking the condition provider database procedure to generate a dynamic filter predicate string from the permission table, converting the dynamic filter predicate string to a query optimizer predicate, injecting the query optimizer predicate in the first collected view node in the query optimizer tree, normalizing a dynamic condition of the first collected view node as a unified filter string, and saving the unified filter string for the dynamic condition of the first collected view node in the query plan.

At 708, in response to determining that the query plan cache includes a cached query plan for the database query, various operations are performed, as described below for steps 710, 712, 714, and 716.

At 710, for each view of the at least one view, a condition provider database procedure is invoked to generate a first filter string from the permission table. The condition provider database procedure can generate different first filter string for different users.

At 712, a determination is made as to whether each first filter string matches a corresponding second filter string in the cached query plan.

At 714, in response to determining that at least one first filter string does not match the corresponding second filter string in the cached query plan, query plan compilation is triggered for the database query.

At 716, in response to determining that each filter string matches each corresponding second filter string in the cached query plan, the database query is executed using the cached query plan.

Figure 8:
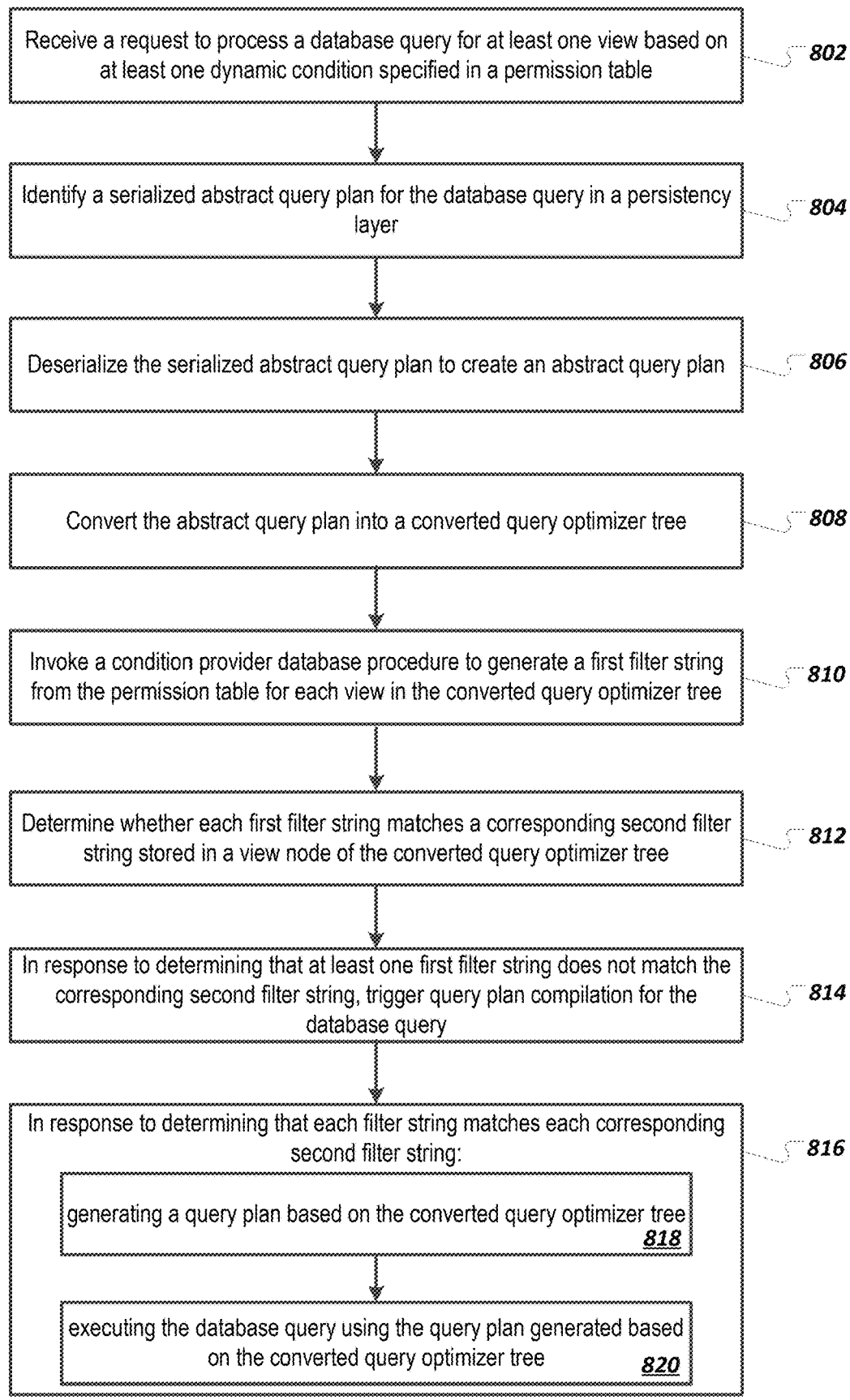
FIG. 8 is a flowchart of an example method for adding persistency support for query plans for queries that include dynamic conditions.

FIG. 8 is a flowchart of an example method for adding persistency support for query plans for queries that include dynamic conditions. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the dynamic condition engine 128 of FIG. 1.

At 802, a request is received to process a database query for at least one view based on at least one dynamic condition specified in a permission table.

At 804, a serialized abstract query plan for the database query is identified in a persistency layer. The serialized abstract query plan is a persisted and serialized query plan for the database query. The serialized abstract query plan can be identified after a database system restart or after a query plan for the database query has been evicted from a query plan cache. The abstract query plan may have been generated from a first query plan produced during query plan compilation. The serialized abstract query plan can be a JavaScript Object Notation or other type of representation of the abstract query plan.

At 806, the serialized abstract query plan is deserialized to create an abstract query plan.

At 808, the abstract query plan is converted into a converted query optimizer tree.

At 810, a condition provider database procedure is invoked to generate a first filter string from the permission table for each view in the converted query optimizer tree. The condition provider database procedure can generate different first filter strings for different users.

At 812, a determination is made as to whether each first filter string matches a corresponding second filter string stored in a view node of the converted query optimizer tree.

At 814, in response to determining that at least one first filter string does not match the corresponding second filter string, query plan compilation is triggered for the database query. Query plan compilation for a query based on dynamic conditions can include: parsing the database query to generate a global query parse tree; converting the global query parse tree to a query compiler tree; and converting the query compiler tree to a query optimizer tree. Query plan compilation can also include traversing the query optimizer tree to collect all view nodes that have a dynamic condition and saving in the query plan, dynamic condition information for collected view nodes.

At 816, in response to determining that each filter string matches each corresponding second filter string, steps 818 and 820 are executed.

At 818, a query plan based is generated based on the converted query optimizer tree.

At 820, the database query is executed using the query plan generated based on the converted query optimizer tree.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a request to process a database query for at least one view based on at least one dynamic condition specified in a permission table;
identifying a serialized abstract query plan for the database query in a persistency layer, wherein the serialized abstract query plan is a persisted and serialized query plan for the database query;
deserializing the serialized abstract query plan to create an abstract query plan;
converting the abstract query plan into a converted query optimizer tree;
invoking a condition provider database procedure to generate a first filter string from the permission table for each view in the converted query optimizer tree;
determining whether each first filter string matches a corresponding second filter string stored in a view node of the converted query optimizer tree;
in response to determining that at least one first filter string does not match the corresponding second filter string, triggering query plan compilation for the database query; and
in response to determining that each filter string matches each corresponding second filter string:
generating a query plan based on the converted query optimizer tree; and
executing the database query using the query plan generated based on the converted query optimizer tree.

2. The computer-implemented method of claim 1, wherein the serialized abstract query plan is identified after a database system restart.

3. The computer-implemented method of claim 1, wherein the serialized abstract query plan is identified after a query plan for the database query has been evicted from a query plan cache.

4. The computer-implemented method of claim 1, wherein the abstract query plan is generated from a first query plan produced during query plan compilation.

5. The computer-implemented method of claim 4, wherein the abstract query plan generated from the first query plan produced during query plan compilation is serialized to produce the serialized abstract query plan.

6. The computer-implemented method of claim 1, further comprising saving the serialized abstract query plan in the persistency layer.

7. The computer-implemented method of claim 6, wherein the serialized abstract query plan comprises a JavaScript Object Notation representation of the abstract query plan.

8. The computer-implemented method of claim 1, wherein query plan compilation comprises:
parsing the database query to generate a global query parse tree;
converting the global query parse tree to a query compiler tree; and
converting the query compiler tree to a query optimizer tree.

9. The computer-implemented method of claim 8, wherein query plan compilation comprises traversing the query optimizer tree to collect all view nodes that have a dynamic condition.

10. The computer-implemented method of claim 9, wherein query plan compilation comprises saving, in the query plan, dynamic condition information for collected view nodes.

11. The computer-implemented method of claim 1, wherein the condition provider database procedure generates different first filter strings for different users.

12. A system comprising:
one or more computers; and
a computer-readable medium coupled to the one or more computers having instructions stored thereon which, when executed by the one or more computers, cause the one or more computers to perform operations comprising:
receiving a request to process a database query for at least one view based on at least one dynamic condition specified in a permission table;
identifying a serialized abstract query plan for the database query in a persistency layer, wherein the serialized abstract query plan is a persisted and serialized query plan for the database query;
deserializing the serialized abstract query plan to create an abstract query plan;
converting the abstract query plan into a converted query optimizer tree;
invoking a condition provider database procedure to generate a first filter string from the permission table for each view in the converted query optimizer tree;
determining whether each first filter string matches a corresponding second filter string stored in a view node of the converted query optimizer tree;
in response to determining that at least one first filter string does not match the corresponding second filter string, triggering query plan compilation for the database query; and
in response to determining that each filter string matches each corresponding second filter string:
generating a query plan based on the converted query optimizer tree; and
executing the database query using the query plan generated based on the converted query optimizer tree.

13. The system of claim 12, wherein the serialized abstract query plan is identified after a database system restart.

14. The system of claim 12, wherein the serialized abstract query plan is identified after a query plan for the database query has been evicted from a query plan cache.

15. The system of claim 12, wherein the abstract query plan is generated from a first query plan produced during query plan compilation.

16. The system of claim 15, wherein the abstract query plan generated from the first query plan produced during query plan compilation is serialized to produce the serialized abstract query plan.

17. A computer program product encoded on a non-transitory storage medium, the product comprising non-transitory, computer readable instructions for causing one or more processors to perform operations comprising:
receiving a request to process a database query for at least one view based on at least one dynamic condition specified in a permission table;
identifying a serialized abstract query plan for the database query in a persistency layer, wherein the serialized abstract query plan is a persisted and serialized query plan for the database query;
deserializing the serialized abstract query plan to create an abstract query plan;
converting the abstract query plan into a converted query optimizer tree;
invoking a condition provider database procedure to generate a first filter string from the permission table for each view in the converted query optimizer tree;
determining whether each first filter string matches a corresponding second filter string stored in a view node of the converted query optimizer tree;
in response to determining that at least one first filter string does not match the corresponding second filter string, triggering query plan compilation for the database query; and
in response to determining that each filter string matches each corresponding second filter string:
generating a query plan based on the converted query optimizer tree; and
executing the database query using the query plan generated based on the converted query optimizer tree.

18. The computer program product of claim 17, wherein the serialized abstract query plan is identified after a database system restart.

19. The computer program product of claim 17, wherein the serialized abstract query plan is identified after a query plan for the database query has been evicted from a query plan cache.

20. The computer program product of claim 17, wherein the abstract query plan is generated from a first query plan produced during query plan compilation.

* * * * *